United States Patent
Jamshidi et al.

(10) Patent No.: US 9,350,734 B1
(45) Date of Patent: May 24, 2016

(54) METHOD AND SYSTEM FOR MANAGING A FLOOD OF DATA-CONNECTION REQUESTS

(71) Applicant: Sprint Spectrum L.P., Overland Park, KS (US)

(72) Inventors: Talat Jamshidi, Leawood, KS (US); Suryan Ramamurthy, Olathe, KS (US); Rajat Kumar, Kansas City, MO (US)

(73) Assignee: Sprint Spectrum L.P., Overland Park, KS (US)

( * ) Notice: Subject to any disclaimer, the term of this patent is extended or adjusted under 35 U.S.C. 154(b) by 152 days.

(21) Appl. No.: 14/070,316

(22) Filed: Nov. 1, 2013

(51) Int. Cl.
*H04L 29/06* (2006.01)
*H04L 12/911* (2013.01)

(52) U.S. Cl.
CPC ............... *H04L 63/10* (2013.01); *H04L 47/74* (2013.01)

(58) Field of Classification Search
None
See application file for complete search history.

(56) References Cited

U.S. PATENT DOCUMENTS

| | | | |
|---|---|---|---|
| 2006/0282880 A1* | 12/2006 | Haverinen | H04L 63/1458 726/3 |
| 2008/0254768 A1 | 10/2008 | Faccin | |
| 2009/0164659 A1* | 6/2009 | Hoshino | H04L 47/10 709/235 |
| 2011/0170532 A1* | 7/2011 | Tchepnda | H04W 12/06 370/338 |
| 2012/0020345 A1 | 1/2012 | Zhou et al. | |
| 2012/0063300 A1 | 3/2012 | Sahin et al. | |
| 2013/0100795 A1 | 4/2013 | Zhao et al. | |
| 2013/0121319 A1 | 5/2013 | Ohta et al. | |

OTHER PUBLICATIONS

European Telecommunications Standards Institute, "Universal Mobile Telecommunications System (UMTS); LTE; Evolved Packet System (EPS); 3GPP EPS AAA interfaces," EISI TS 129 273, version 11.7.0 (Sep. 2013).
Jonathan Morgan, "Evolution Options from CDMA to LTE: The Benefits of eHRPD", Mobility Techzone, Aug. 19, 2008, http://www.mobilitytechzone.com/topics/4g-wirelessevolution/articles/37366-evolution-options-from-cdma-lte-benefits-ehrpd.htm.
P. Calhoun et al., "Diameter Network Access Server Application", Request for Comments: 4005, Network Working Group, Aug. 2005.
S. Gundavelli, Ed. et al., "Proxy Mobile IPv6", Request for Comments: 5213, Network Working Group, Aug. 2008.
J. Sermersheim, Ed. et al., "Lightweight Directory Access Protocol (LDAP): The Protocol", Request for Comments: 4511, Network Working Group, Jun. 2006.
P. Eronen, Ed et al., "Diameter Extensible Authentication Protocol (EAP) Application", Request for Comments: 4072, Network Working Group, Aug. 2005.

(Continued)

*Primary Examiner* — Awet Haile

(57) ABSTRACT

A gateway may respond to a data-connection request, relating to a request to establish a packet data connection for a requesting wireless communication device (WCD), based on a request rate determined from the number of other data-connection requests that the gateway has received during a particular period of time. If the request rate is below a first threshold, the gateway may initiate an authentication process to authenticate the requesting WCD and either accept or reject the data-connection request based on whether the authentication process is successful or unsuccessful. If the request rate is greater than the first threshold and less than a second threshold, the gateway may accept the data-connection request without initiating the authentication process. If the request rate is greater than the second threshold, the gateway may reject the data-connection request without initiating the authentication process.

20 Claims, 8 Drawing Sheets

(56) References Cited

OTHER PUBLICATIONS

B. Aboba et al., "Extensible Authentication Protocol (EAP)", Request for Comments: 3748, Network Working Group, Jun. 2004.

J. Arkko et al., "Improved Extensible Authentication Protocol Method for 3rd Generation Authentication and Key Agreement (EAP-AKA')", Request for Comments: 5448, Network Working Group, May 2009.

J. Carlson et al., "Point-to-Point Protocol (PPP) Vendor Protocol", Request for Comments: 3772, Network Working Group, May 2004.

W. Simpson, "The Point-to-Point Protocol (PPP)", Request for Comments: 1661, Network Working Group, Jul. 1994.

\* cited by examiner

METHOD AND SYSTEM FOR MANAGING A FLOOD OF DATA-CONNECTION REQUESTS

BACKGROUND

Wireless networks may provide packet data services to wireless communication devices (WCDs). For example, a wireless network may include one or more packet gateways to one or more packet data networks. A WCD may request a packet data connection and, if the wireless network is able to authenticate the WCD for the request, the wireless network may connect the WCD to one of the packet data networks through one of the packet gateways.

The authentication process may involve a number of different steps in which various network entities exchange various messages. However, each network entity involved in the authentication process may be able to reliably handle only a certain number of such messages within a given period of time. If a network entity involved in the authentication process receives a flood of messages that exceeds that entity's capacity to handle reliably, then the authentication process may fail for one or more WCDs. A flood of authentication messages may occur, for example, when a relatively large number of WCDs request packet data connections at about the same. Thus, in some situations, a WCD that is in fact authorized to establish a packet data connection may be unable to do so simply because a network entity involved in the authentication process is overwhelmed by a temporary high volume of authentication messages.

OVERVIEW

In one aspect, example embodiments provide a method for a gateway. The gateway receives a number of data-connection requests during a period of time, wherein each data-connection request relates to establishing a respective packet data connection for a respective wireless communication device (WCD). The gateway determines a request rate based on the number of data-connections received during the period of time. The gateway receives an additional data-connection request, wherein the additional data-connection request relates to establishing a packet data connection for a requesting WCD. In response to receiving the additional data-connection request, the gateway determines whether to authenticate the requesting WCD based on the request rate.

In another aspect, example embodiments provide a system comprising a network interface, a processor, data storage, and program instructions stored in the data storage and executable by the processor to perform functions. The functions include: (i) receiving, via the network interface, a number of data-connection requests during a period of time, wherein each data-connection request relates to establishing a respective packet data connection for a respective wireless communication device (WCD); (ii) determining a request rate based on the number of data-connection requests received during the period of time; (iii) receiving, via the network interface, an additional data-connection request, wherein the additional data-connection request relates to establishing a packet data connection for a requesting WCD; and (iv) in response to receiving the additional data-connection request, determining whether to authenticate the requesting WCD based on the request rate.

DETAILED DESCRIPTION

1. Introduction

To address the possibility that a flood of authentication messages may occur because of a relatively large number of WCDs requesting packet data connections at about the same time, the methods and systems disclosed herein allow for a packet data connection to be established for a WCD, and temporarily used by the WCD, without authenticating the WCD.

In an example, a gateway (e.g., a serving gateway or packet gateway) may respond to a data-connection request, relating to a request to establish a packet data connection for a requesting WCD, based on a request rate determined from the number of other data-connection requests that the gateway has received during a particular period of time.

If the request rate is below a first threshold, the gateway may initiate an authentication process to authenticate the requesting WCD and either accept or reject the data-connection request based on whether the authentication process is successful or unsuccessful.

If the request rate is greater than the first threshold and less than a second threshold, the gateway may accept the data-connection request and establish a packet data connection for the requesting WCD without initiating the authentication process. The gateway may also store an identification of the requesting WCD for subsequent authentication, and the gateway may continue calculating new request rates for subsequent periods of time. When the gateway determines that a new request rate is threshold low, e.g., lower than the first threshold, the gateway may then initiate an authentication process to authenticate the requesting WCD.

If the request rate is greater than the second threshold, the gateway may reject the data-connection request without initiating the authentication process. The gateway may also transmit to the requesting WCD and indication that its data-connection request is rejected due to a flood of data-connection requests, and the gateway may instruct the requesting WCD to wait for a specified period of time before sending another data-connection request.

In this way, when a relatively large number of WCDs send data-connection requests at about the same time, as indicated by a request rate exceeding a threshold, packet data sessions can be established for the WCDs without authenticating the WCDs, so as to avoid overwhelming the network with authentication messages. The WCDs may subsequently be authenticated, once the flood of data-connection requests has subsided.

2. Example Wireless Communication System

Figure 1:
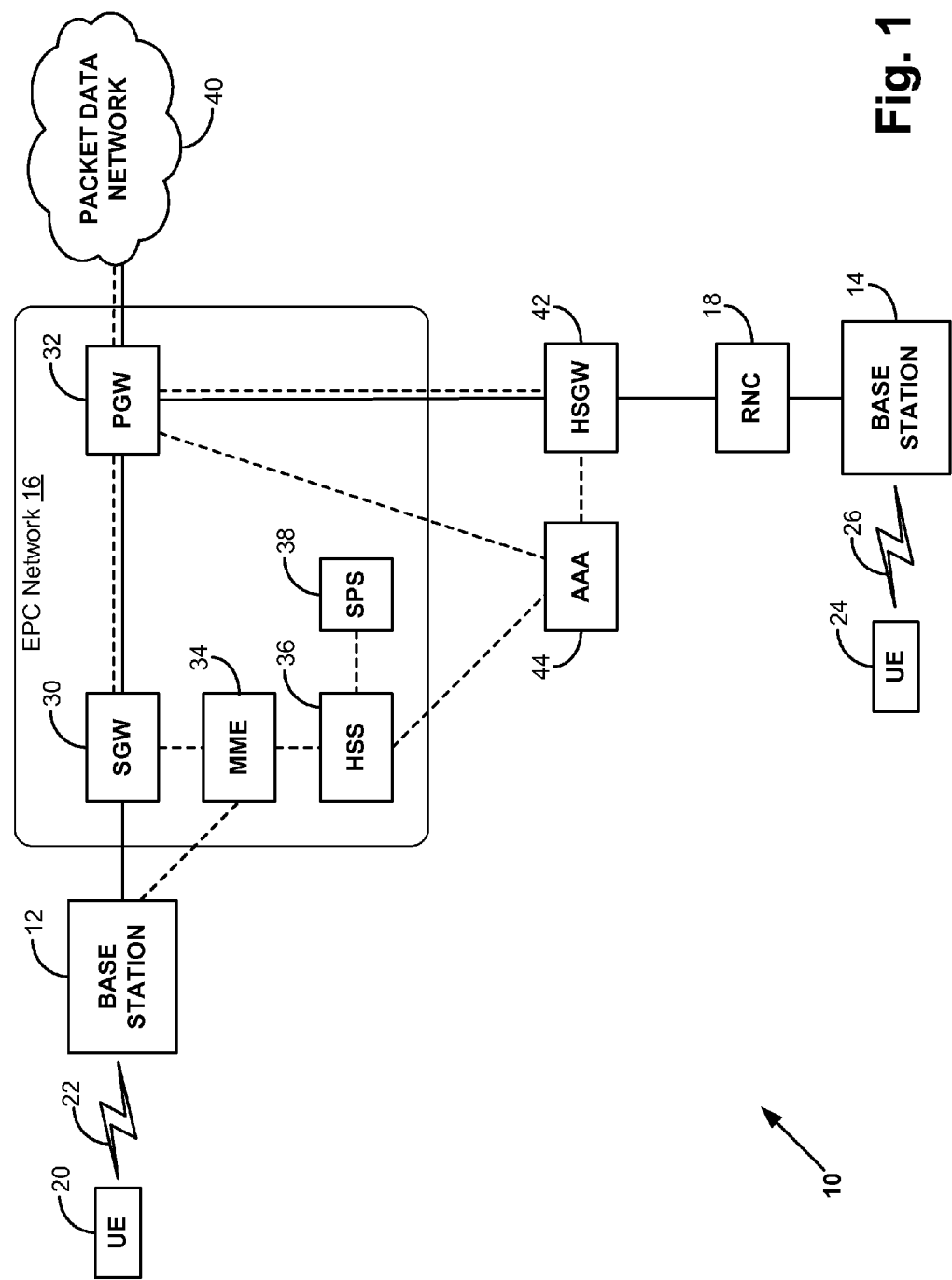
FIG. 1 is a block diagram of a wireless communication system, in accordance with an example embodiment.

FIG. 1 illustrates an example wireless communication system 10 in which aspects of the present disclosure can be implemented. In FIG. 1, connections that carry bearer traffic are indicated by solid lines, connections that carry signaling traffic are indicated by dashed lines, and connections that carry both bearer traffic and signaling traffic are indicated by solid lines in combination with dashed lines. It is to be understood, that the arrangement of wireless communication system 10 shown in FIG. 1, and the processes described herein, are set forth herein for purposes of example only. Other arrangements and elements (e.g., machines, interfaces, functions, orders of elements, etc.) can be added or used instead, and some elements may be omitted altogether. Further, those skilled in the art will appreciate that many of the elements described herein are functional entities that may be implemented as discrete components or in conjunction with other components, in any suitable combination and location, and that various disclosed functions can be implemented by any combination of hardware, firmware, and/or software, such as by one or more processors programmed to execute computer instructions for instance.

In this example, wireless communication system 10 includes two different types of base stations, exemplified by base station 12 and base station 14. Base station 12 (e.g., an eNodeB) is part of an evolved radio access network (RAN) that uses an Evolved Packet Core (EPC) network 16. Base station 14 is part of a legacy RAN that includes a radio network controller (RNC) 18. Base stations 12 and 14 each provide a respective wireless coverage area within which the base station can communicate with one or more WCDs, also referred to herein as user equipment (UE). The wireless coverage areas provided by base stations 12 and 14 could be either overlapping or non-overlapping. As shown, base station 12 is in wireless communication with UE 20 via an air interface 22, and base station 14 is in wireless communication with UE 24 via an air interface 26. UEs 20 and 24 could be wireless telephones, wirelessly-equipped handheld, tablet, or laptop computers, or any other type of WCD.

Base stations 12 and 14 communicate with UEs using different air interface protocols. In one example, base station 12 communicates with UEs, such as UE 20, using a Long Term Evolution (LTE) protocol, whereas base station 14 communicates with UEs, such as UE 22, using a High Rate Packet Data (HRPD) protocol, such as EVDO. It is to be understood, however, that these air interface protocols are given merely as illustrative examples. In general, base stations 12 and 14 may communicate using any air interface protocol that is known currently or may be developed.

As shown in FIG. 1, EPC network 16 includes a serving gateway (SGW) 30, a packet gateway (PGW) 32, a mobility management entity (MME) 34, a home subscriber server (HSS) 36, and a subscriber profile store (SPS) 38. PGW 32 provides connectivity to a packet data network 40. SGW 30 supports Internet Protocol (IP) bearer traffic between base station 12 and PGW 32. MME 34 manages signaling traffic between base station 12 and various elements in EPC network 16, for example, relating to authentication of UEs and activating and de-activating bearer connections for UEs. HSS 36 is configured to authenticate UEs, as well as access subscriber profiles stored in SPS 38. For example, SPS 38 may store subscriber profiles for UEs that are authorized to use EPC network 16.

With this configuration, EPC network 16 can provide packet data connections to packet data network 40 for UEs served by base stations in an evolved RAN, for example, UE 20 served by base station 12. The packet data connections that EPC network 16 provides to UEs may, in turn, be used for Web access, email, text, voice-over-IP (VoIP), video, streaming media, gaming, and/or other packet data services.

In addition, EPC network 16 may provide packet data connections to packet data network 40 for UEs served by other RANs, such as UEs served by legacy RANs. In the example shown in FIG. 1, wireless communication system 10 includes an HRPD serving gateway (HSGW) 42 that supports interworking between a legacy RAN, exemplified in FIG. 1 by base station 14 and RNC 18, and EPC network 16. This interworking may involve (i) HSGW 42 communicating with an authentication, authorization, and accounting (AAA) server 44, which, in turn, may communicate with HSS 36, and (ii) HSGW 42 communicating with PGW 32.

For example, UE 24 served by base station 14 may transmit a data-connection request that relates to establishing a packet data connection. HSGW 42 may receive the data-connection request via base station 14 and RNC 18, and, in response, communicate with AAA 44 to authenticate UE 24. As part of the authentication process, AAA 44 may perform various functions, such as communicating with HSS 36, issuing an authentication challenge to UE 24, evaluating a response from UE 24 to the authentication challenge, and indicating to HSGW 42 whether the authentication process is successful or unsuccessful. If the authentication process is successful, HSGW 42 may communicate with PGW 32 to request a packet data connection to packet data network 40 for UE 24. In response to the request from HSGW 42, PGW 32 may communicate with AAA 44 to authenticate UE 24 in another authentication process. If that authentication process is successful, the PGW 32 may establish the packet data connection, which then enables UE 24 to communicate with packet data network 40 via air interface 26, base station 14, RNC 18, HSGW 42, and PGW 32.

In some instances, HSGW 42 may experience a flood of data-connection requests from UEs. This may occur, for example, when the HSGW 42 (or other network element) has gone off-line and then goes back on-line. When the HSGW 42 goes back on-line, a large number of UEs may transmit data-connection requests in order to re-establish packet data connections. A flood of data-connection requests may also occur in a scenario in which base stations 12 and 14 have overlapping coverage areas and base station 12 goes off-line. In order to continue their respective packet data communication sessions, the UEs that were previously served by base station 12 may transmit data-connection requests to base station 14 instead.

The flood of data-connection requests can cause difficulties because the network elements with which HSGW 42 may normally communicate in response to the data-connection requests (e.g., AAA 44 and PGW 32) may have limited capabilities to handle requests from HSGW 42. For example, communications with AAA 44 may become unreliable when AAA 44 receives requests at a rate that exceeds one particular level (e.g., 5,000 requests per second), and communications with PGW 32 may become unreliable when PGW 32 receives requests at a rate that exceeds another particular level (e.g., 10,000 requests per second). To address such difficulties, HSGW 42 may adjust how it responds to data-connection requests based on the rate at it which receives data-connection requests.

For example, as discussed in more detail below, when HSGW 42 receives data-connection requests at a rate that exceeds a threshold rate, HSGW 42 and PGW 32 may both forego communications with AAA 44 that would normally be used to authenticate UEs. In this way, packet data connections may be established for and may be used by UEs (at least temporarily), without the UEs being authenticated. The UEs may subsequently be authenticated when the rate at which HSGW 42 receives data-connection requests is sufficiently reduced, for example, when the rate falls below the threshold rate.

The threshold rate may be set based on the request rate that AAA 44 can handle reliably. Thus, it can be possible to avoid burdening AAA 44 by having HSGW 42 and PGW 32 forego the authentication process when the rate of data-connection requests exceeds the threshold rate. However, other network elements, such as PGW 32 can also become overburdened if the rate of data-connection requests is sufficiently high. As a result, the HSGW 42 may also take a higher threshold rate into account. The higher threshold rate may be based on the request rate that PGW 32 (or other network element) can handle reliably. If HSGW 42 receives data-connection requests at a rate that exceeds this higher threshold, HSGW 42 may simply reject the data-connection requests, without attempting to authenticate the UEs.

3. Example Methods

Figure 2:
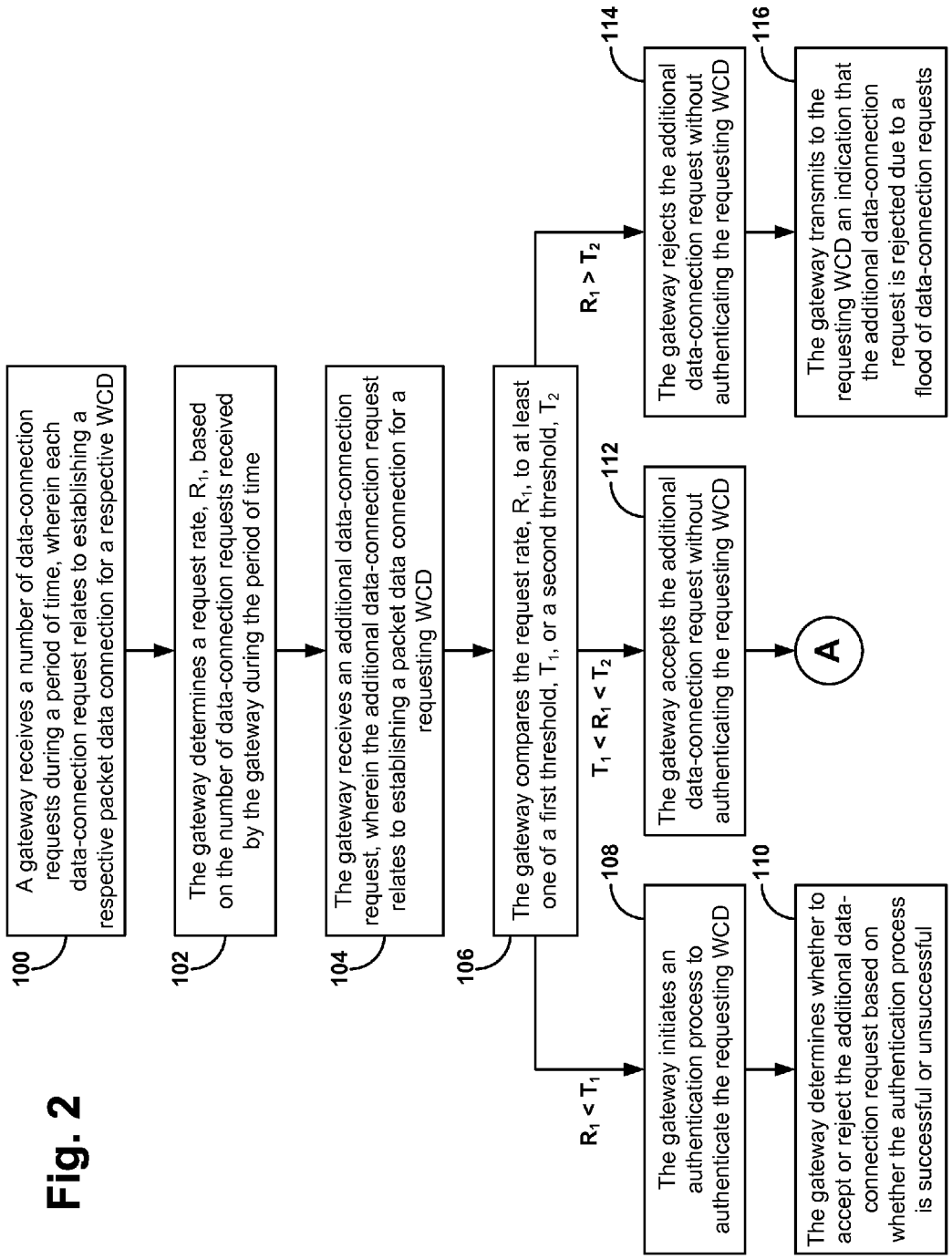
FIG. 2 is a flow chart illustrating a method, in accordance with an example embodiment.
Figure 3:
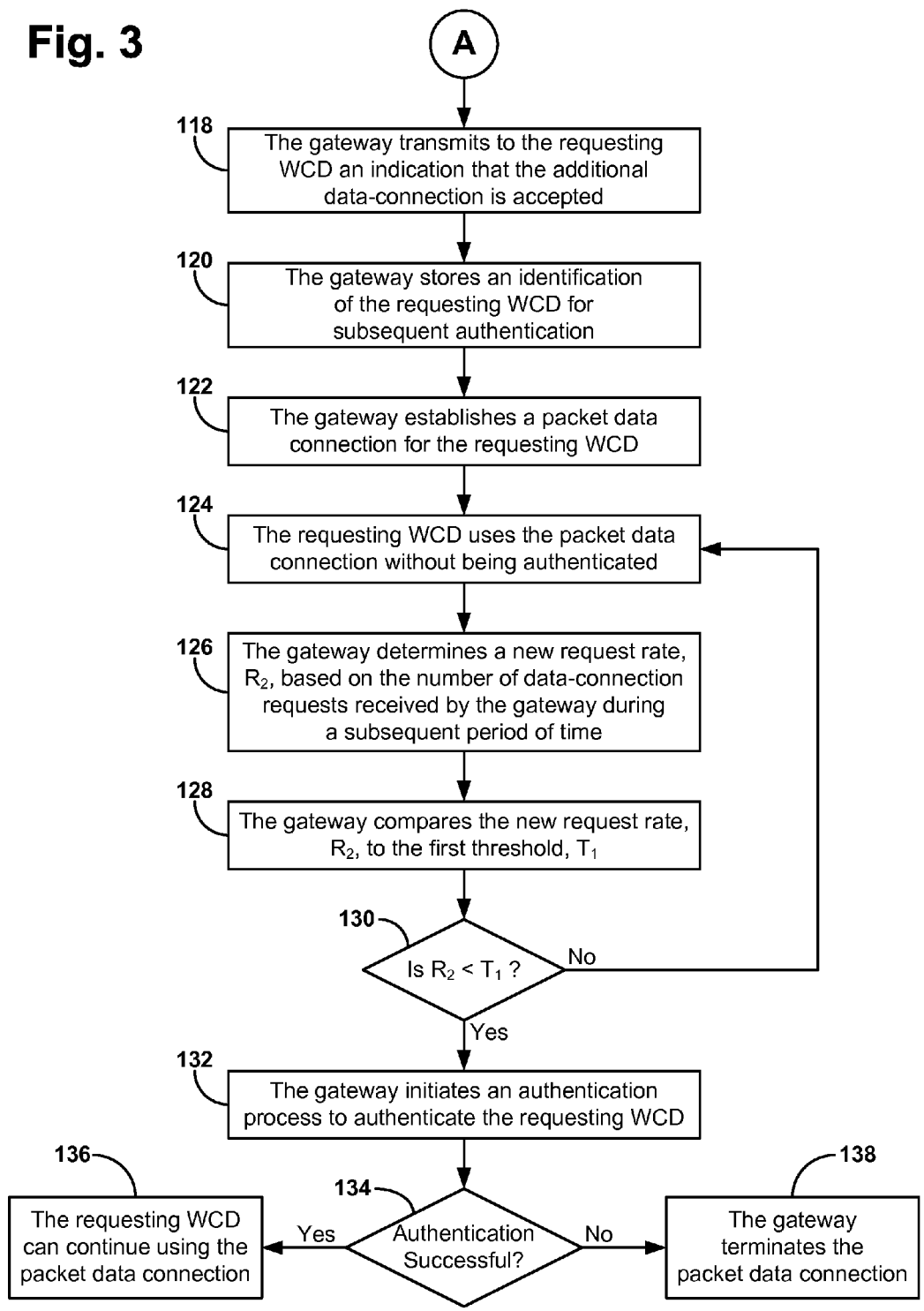
FIG. 3 is a flow chart illustrating a continuation of the method of FIG. 2, in accordance with an example embodiment.

FIGS. 2 and 3 are flow charts illustrating an example method in which a gateway determines how to respond to a data-connection request based on a request rate. In this example method, the gateway could be either HSGW 42 or PGW 32 in the wireless communication system 10 illustrated in FIG. 1. Alternatively, the gateway in this example method could be an HSGW or PGW in a differently-configured wireless communication system and/or could be other than an HSGW or PGW.

The method of FIG. 2 begins when a gateway (e.g., HSGW 42 or PGW 32) receives a number of data-connection requests during a period of time, as indicated by block 100. Each data-connection request relates to establishing a respective packet data connection for a respective WCD. The data-connection requests may include Layer 2 requests, i.e., any request in an overall process for establishing a data connection at the data link layer, such as a request that uses the Point-to-Point Protocol (PPP) or Extensible Authentication Protocol (EAP). Alternatively or additionally, the data-connection requests may include Layer 3 requests, i.e., any request in an overall process for establishing a data connection at the network layer, such as a request that uses a Simple IP or Mobile IP protocol. The period of time could be any period of time that the gateway uses to develop a count of data-connection requests for purposes of determining a request rate. For example, the period of time could correspond to one second, to a plurality of seconds (e.g., 5 seconds), or to a fraction of a second.

As indicated by block 102, the gateway determines a request rate, $R_1$, based on the number of data-connection requests received by the gateway during the period of time. The request rate, $R_1$, may be expressed as a number, such as requests per second. In some examples, the request rate $R_1$, may be the basic request rate that is determined by counting the number of data-connection requests received during the period of time and then dividing the count by the duration of the period of time. In other examples, the request rate $R_1$, may be an average request rate that is calculated by averaging (on either a weighted or non-weighted basis) the basic request rate determined for the period of time with the request rates determined for one or more previous periods of time.

As indicated by block 104, the gateway receives an additional data-connection request, wherein the additional data-connection request relates to establishing a packet data connection for a requesting WCD (e.g., UE 24). The additional data-connection request could be any data-connection request that the gateway receives after determining the request rate. For example, if the gateway determines request rates every second, and the gateway has determined a request rate for a particular one-second period, the additional data-connection request could be received during the one-second period immediately following the particular one-second period.

To determine how to respond to the additional data-connection request, the gateway may compare the request rate, $R_1$, to one or more preset thresholds. In the example method illustrated in FIG. 2, the gateway compares the request rate $R_1$, to at least of a first threshold, $T_1$, or a second threshold $T_2$, as indicated by block 106. The first threshold, $T_1$, is less than the second threshold $T_2$. For example, the first threshold, $T_1$, may be set based on a maximum request rate that AAA 44 can process reliably, and the second threshold $T_2$, may be set based on a maximum request rate that PGW 32 can process reliably.

How the gateway responds to the additional data-connection request depends on whether $R_1$ is less than $T_1$, greater than $T_1$ but less than $T_2$, or greater than $T_2$. If $R_1$ is less than $T_1$, the gateway may initiate an authentication process to authenticate the requesting WCD, as indicated by block 108. The authentication process may involve HSGW 42 communicating with AAA 44, and AAA 44 communicating with HSS 36, for example, as described in more detail below. The gateway then determines whether to accept or reject the additional data-connection request based on whether the authentication process is successful or unsuccessful, as indicated by block 110.

If $R_1$ is greater than $T_1$ but less than $T_2$, the gateway may accept the additional data-connection request without authenticating the requesting WCD, as indicated by block 112. The gateway may further respond to the additional data-connection request as illustrated in FIG. 3 and discussed below.

If $R_1$ is greater than $T_2$, the gateway may reject the additional data-connection request without authenticating the requesting WCD, as indicated by block 114. Based on this rejection, the gateway may transmit to the requesting WCD an indication that the additional data-connection request is rejected due to a flood of data-connection requests, as indicated by block 116. The gateway may also instruct the requesting WCD to wait for a specified period of time before sending another data-connection request.

FIG. 3 further illustrates the example method of FIG. 2 for the case that the gateway accepts the additional data-connection request without authenticating the requesting WCD (block 112). Based on the acceptance of the additional data-connection request, the gateway transmits to the requesting WCD an indication that the additional data-connection request is accepted, as indicated by block 118. In addition, the gateway stores an identification of the requesting WCD for subsequent authentication, as indicated by block 120. For example, the gateway may maintain a list of WCDs for which the gateway has accepted data-connection requests without authentication. As described below, the gateway may refer to this list to determine which WCDs should be authenticated once the request rate has become sufficiently low.

With the requesting WCD's data-connection request having been accepted, the gateway may proceed with establishing a packet data connection for the requesting WCD, as indicated by block 122. To establish the packet data connection, the gateway may communicate with one or more other network elements and may instruct the one or more network elements to suppress the authentication process that would normally be used. For example, HSGW 42 may request PGW 32 to establish a packet data connection for the requesting WCD without authenticating the requesting WCD. In response, PGW 32 may establish the packet data connection for the requesting WCD and may store an identification of the requesting WCD for subsequent authentication.

Once the packet data connection has been established, the requesting WCD can use the packet data connection without being authenticated, as indicated by block 124. At some point, however, the requesting WCD's ability to continue using the packet data connection may be contingent on the requesting WCD being successfully authenticated, for example, once the flood of data-connection requests has passed. In particular, after determining the request rate, $R_1$, for the period of time, the gateway may determine a new request rate, $R_2$, based on the number of data-connection requests received during a subsequent period of time, as indicated by block 126. The gateway may then compare the new request rate, $R_2$, to the first threshold, $T_1$, as indicated by block 128.

Whether the gateway proceeds with authenticating the requesting WCD, may depend on whether $R_2$ is less than $T_1$, as indicated by block 130. If $R_2$ is not less than $T_1$, then the requesting WCD can continue using the packet data connection without being authenticated (block 124). However, if $R_2$ is less than $T_1$, the gateway may initiate an authentication process to authenticate the requesting WCD, as indicated by block 132. More particularly, the gateway may authenticate each WCD identified in its list of WCDs for subsequent authentication. The gateway may also instruct one or more other network elements (e.g., PGW 32) to authenticate the WCDs for which authentication had been suppressed.

Whether the requesting WCD can continue using the packet data connection may depend on whether the authentication is successful, as indicated by block 134. If the authentication process is successful, then the requesting WCD can continue using the packet data connection, as indicated by block 136. If the authentication process is unsuccessful, the gateway may terminate the packet data connection, as indicated by block 138.

In this way, when a gateway is flooded with data-connection requests, the gateway can establish packet data connection for WCDs and temporarily allow the WCDs to use the packet data connections, without authenticating the WCDs until after the flood has passed.

Figure 4:
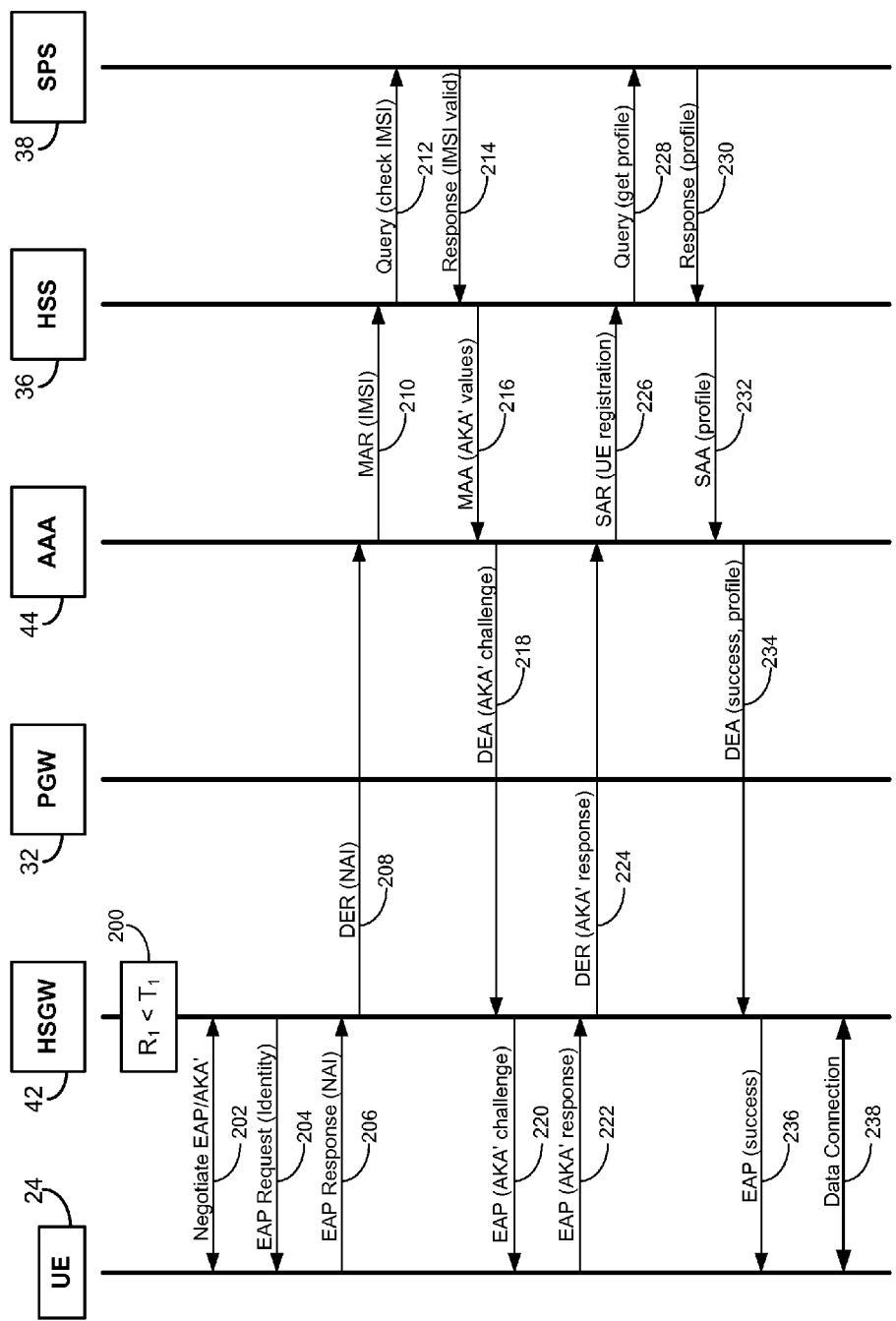
FIG. 4 is a diagram illustrating a call flow for a scenario in which a request rate is less than a first threshold, in accordance with an example embodiment.
Figure 5:
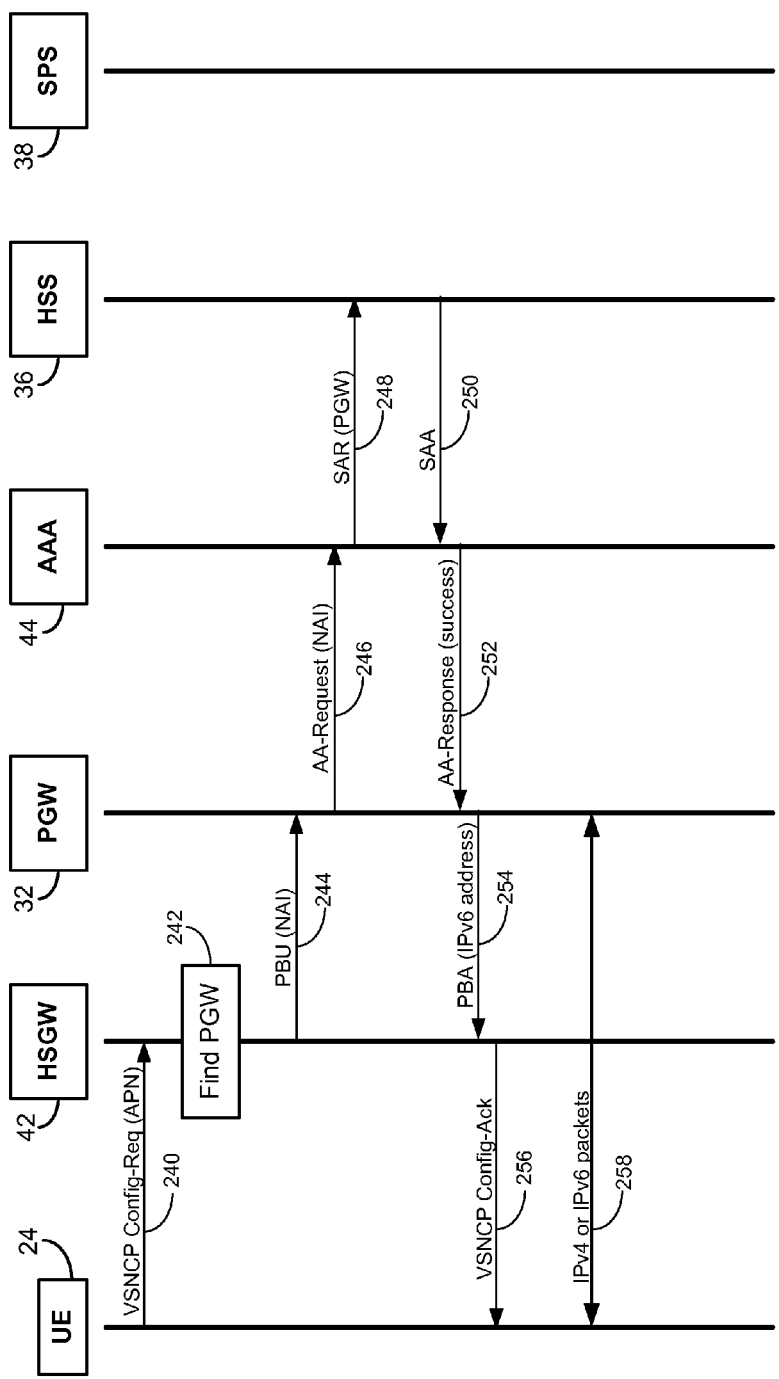
FIG. 5 is a diagram illustrating a continuation of the call flow of FIG. 4, in accordance with an example embodiment.

FIGS. 4 and 5 illustrate a call flow for an example in which the gateway, HSGW 42, has calculated a request rate, $R_1$, and has determined that the request rate, $R_1$, is less than the first threshold, $T_1$ (step 200). In this example, UE 24 (a WCD) requests a packet data connection in two phases. In the first phase (illustrated by the call flow in FIG. 4), UE 24 requests a Layer 2 data connection with HSGW 42, using the PPP protocol. In the second phase (illustrated by the call flow in FIG. 5), UE 24 requests a Layer 3 data connection with a packet data network identified by an Access Point Name (APN), using the Vendor-Specific Network Control Protocol (VSNCP). PPP is described in Request for Comments 1661 (July 1994), which is incorporated herein by reference. VSNCP is described in Request for Comments 3772 (May 2004), which is incorporated herein by reference.

During the PPP communications, UE 24 and HSGW 42 negotiate the use of the Extensible Authentication Protocol (EAP) with the AKA' authentication method (step 202). EAP is described in Request for Comments 3748 (June 2004), which is incorporated herein by reference. The AKA' authentication method is described in Request for Comments 5448 (May 2009), which is incorporated herein by reference. HSGW 42 sends an EAP request to UE 24 to provide an identity (step 204), and UE 24 provides an EAP response (step 206) that includes a Network Access Identifier (NAI). In this example call flow, the NAI includes an International Mobile Subscriber Identity (IMSI) that identifies a subscriber associated with UE 24.

Based on $R_1$ being less than $T_1$, HSGW 24 initiates an authentication process to authenticate UE 24. In this example call flow, the authentication process involves HSGW 42 communicating with AAA 44, using the Diameter-EAP-Request (DER) and Diameter-EAP-Answer (DEA) messages. DER and DEA messages are described in Request for Comments 4072 (August 2005), which is incorporated herein by reference. The authentication process further involves AAA 44 communicating with HSS 36, using Multimedia-Authentication-Request (MAR), Multimedia-Authentication-Answer (MAA), Server-Assignment-Request (SAR), and Server-Assignment-Answer (SAA) messages. MAR, MAA, SAR, and SAA messages are described in European Telecommunications Standards Institute, "3GPP EPS AAA interfaces," TS 129 273, version 11.7.0 (September 2013), which is incorporated herein by reference. The authentication process also involves HSS 36 communicating with SPS 38, using the Lightweight Directory Access Protocol (LDAP). LDAP is described in Request for Comments 4511 (June 2006), which is incorporated herein by reference.

HSGW 24 transmits to AAA 44 a DER message containing the NAI provided by UE 24 (step 208). AAA 44 extracts the IMSI from the NAI and transmits to HSS 36 an MAR message with the IMSI (step 210). In response, HSS 36 queries SPS 38 to check whether the IMSI is valid, i.e., whether the IMSI is associated with any of the subscriber profiles stored in SPS 38 (step 212).

In this example, SPS 38 responds with an indication that the IMSI is valid (step 214). Based on this response, HSS 36 uses an algorithm to generate values for authenticating UE 24 using the AKA' authentication method. HSS 36 transmits the AKA' values to AAA 44 in an MAR message (step 216). Based on the AKA' values, AAA 44 generates an AKA' challenge and transmits the AKA' challenge to HSGW 42 in a DEA message (step 218). HSGW 42 then forwards the AKA' challenge to UE 24 in an EAP message (step 220).

UE 24 generates a response to the AKA' challenge and transmits the AKA' response to HSGW 24 in an EAP message (step 222). HSGW 42 forwards the AKA' response to AAA 44 in a DER message (step 224). Based on the AKA' response, AAA 44 determines whether the authentication is successful or unsuccessful.

In this example, AAA 44 determines that authentication is successful. In response to UE 24 being successfully authenticated, AAA 44 sends an SAR message to HSS 36 to register UE 24 (step 226). HSS 36 queries SPS 38 to get the subscriber profile associated with the IMSI of UE 24 (step 228), and SPS 38 responds with the subscriber profile (step 230). HSS 36 stores the subscriber profile and also sends the subscriber profile to AAA 44 in an SAA message (step 232). AAA 44 then sends to HSGW 42 a DEA message that indicates that authentication of UE 24 was successful and that includes the subscriber profile associated with UE 24 (step 234). In response, HSGW 42 sends to UE 24 an EAP message that indicates that authentication was successful (step 236). This EAP message also indicates that the UE's request for a Layer 2 data connection with HSGW 42 has been accepted. Thus, at this point, UE 24 and HSGW 42 can communicate with one another over a data connection 238.

In this example, UE 24 further requests a Layer 3 (network layer) configuration of the data connection 238, as illustrated in FIG. 5. In this example call flow, HSGW 42 and PGW 32 communicate using Proxy Binding Update (PBU) and Proxy Binding Acknowledgement (PBA) messages, and PGW 32 and AAA 44 communicate using AA-Request and AA-Response messages. PBU and PBA messages are described in Request for Comments 5213 (August 2008), which is incorporated herein by reference. AA-Request and AA-Response messages are described in Request for Comments 4005 (August 2005), which is incorporated herein by reference.

UE 24 requests the Layer 3 configuration by transmitting to HSGW 42 a VSNCP Configuration-Request message that includes an APN (step 240). Based on the APN, HSGW 42 identifies PGW 32 (step 242), for example, by querying a domain name server (DNS). HSGW 42 then sends to PGW 32 a PBU message that identifies UE 24 by its NAI and includes a proxy care-of address for the UE 24 (step 244).

In response, PGW 32 authenticates UE 24 by transmitting an AA-Request message with the NAI to AAA 44 (step 246). AAA 44 determines whether UE 24 is authorized to use PGW 32 based on the subscriber profile that AAA 44 received from HSS 36, as described in above. In this example, AAA 44 determines that UE 24 is authorized to use PGW 32. Thus, AAA 44 sends to HSS 36 an SAR message that identifies PGW 32 as serving UE 24 (step 248). HSS 36 responds by sending an SAA message to AAA 44 (step 250). AAA 44 then sends to PGW 32 an AA-Response message indicating that authentication was successful (step 252).

Based on the successful authentication, PGW 32 assigns an IPv6 address as a home address of UE 24 and associates this IPv6 home address with the proxy care-of address provided in the PBU message. PGW 32 then sends to HSGW 42 a PBA message that includes the IPv6 home address assigned to UE 24 (step 254).

The PBA message indicates to HSGW 42 that UE 24 has been successfully authenticated for the requested APN. Thus, HSGW 42 sends to UE 24 a VSNCP Configuration-Acknowledgement message that indicates that the UE's request to connect to the requested APN is accepted. At this point, UE 24 has a packet data connection 258 with PGW 32 that enables UE 24 to send and receive either IPv4 or IPv6 packets. In this packet data connection, HSGW 42 and PGW 32 exchange the packets from or to UE 24 via a bi-directional tunnel.

Figure 6:
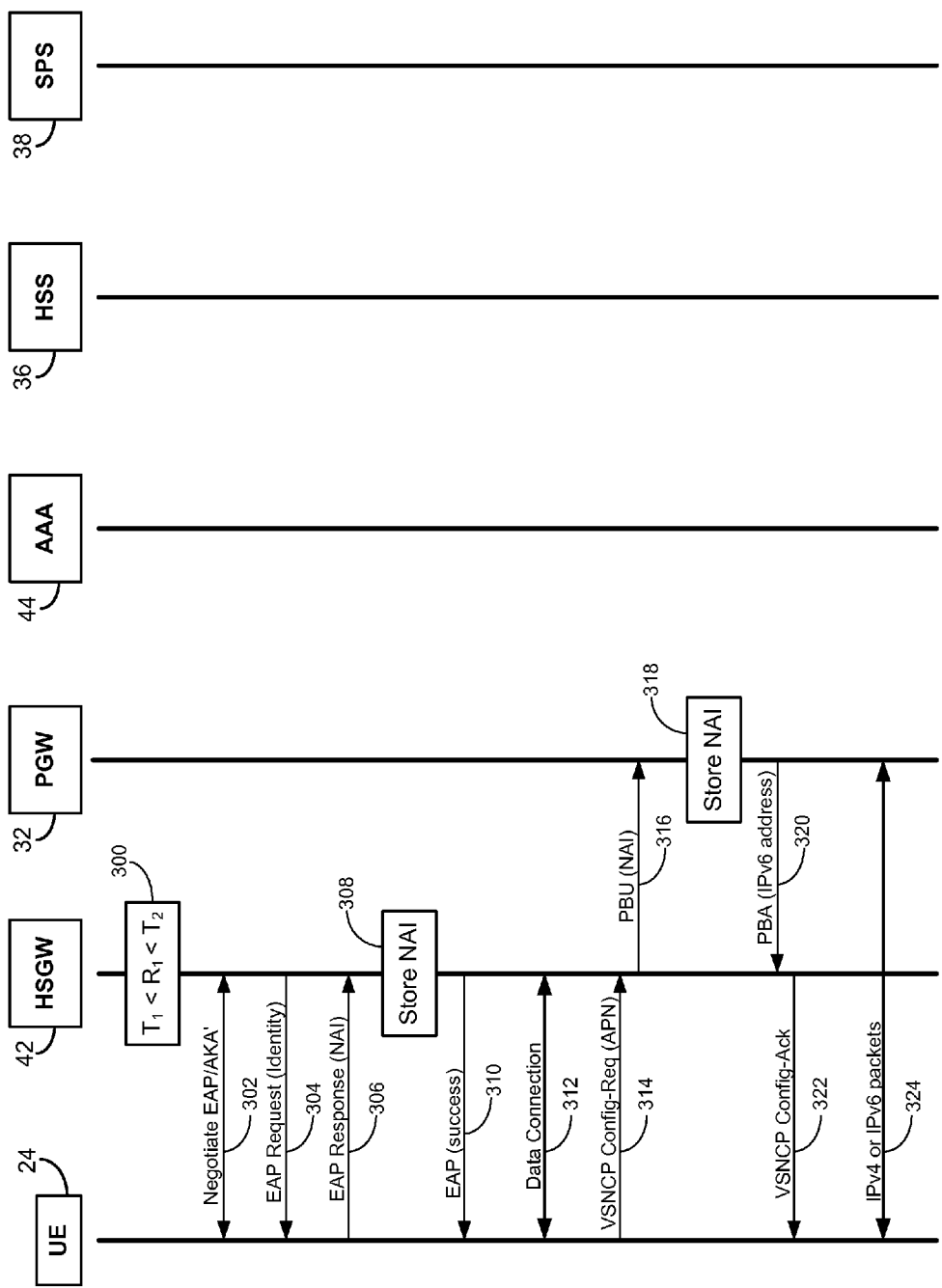
FIG. 6 is a diagram illustrating a call flow for a scenario in which a request rate is greater than a first threshold and less than a second threshold, in accordance with an example embodiment.

FIG. 6 illustrates a call flow for an example in which the gateway, HSGW 42, has calculated a request rate, $R_1$, and has determined that the request rate, $R_1$, is greater than the first threshold, $T_1$, but less than the second threshold, $T_2$ (step 300). As in the FIG. 4 example, UE 24 and HSGW 42 negotiate the use of the EAP protocol with the AKA' method (step 302), HSGW 42 sends an EAP request to UE 24 to provide its identity (step 304), and UE 24 complies by sending an EAP response with its NAI (step 306). Thus, UE 24 has sent a data-connection request to HSGW 42. However, because $T_1<R_1<T_2$, HSGW 42 does not authenticate UE 24. Instead, HSGW 42 stores the NAI provided by UE 24 for subsequent authentication (step 308). HSGW 42 also sends to UE 24 an EAP message indicating that authentication was successful and that the UE's request for a data connection is accepted (step 310). Thus, at this point, UE 24 and HSGW 42 have an established data connection 312.

As in the FIG. 5 example, UE 24 then sends a VSNCP Configuration-Request message that identifies a requested APN (step 314). Based on the APN, HSGW 42 identifies PGW 32 and transmits to PGW 32 a PBU message that includes a proxy care-of address of UE 24 and the UE's NAI (step 316). In this example, PGW 32 suppresses the authentication process that it would normally undertake to authenticate UE 24. PGW 32 may suppress authentication based on an instruction from HSGW 42 (the instruction could be included in the PBU message of step 316), based on its own calculated request rate, or based on other information.

Thus, instead of authenticating UE 24, PGW 32 stores the UE's NAI for subsequent authentication (step 318) and proceeds with the requested address binding. Specifically, PGW 32 assigns an IPv6 address as a home address of UE 24, associates this home address with the proxy care-of address provided in the PBU message, and sends to HSGW 42 a PBA message with the IPv6 home address (step 320). HSGW 42 then sends to UE 24 a VSNCP Configuration-Acknowledgement message indicating that the UE's request to connect to the requested APN is accepted (step 322). At this point, UE 24 has a packet data connection 324 with PGW 32 that enables UE 24 to send and receive either IPv4 or IPv6 packets (HSGW 42 and PGW 32 exchange the packets via a bi-directional tunnel).

Figure 7:
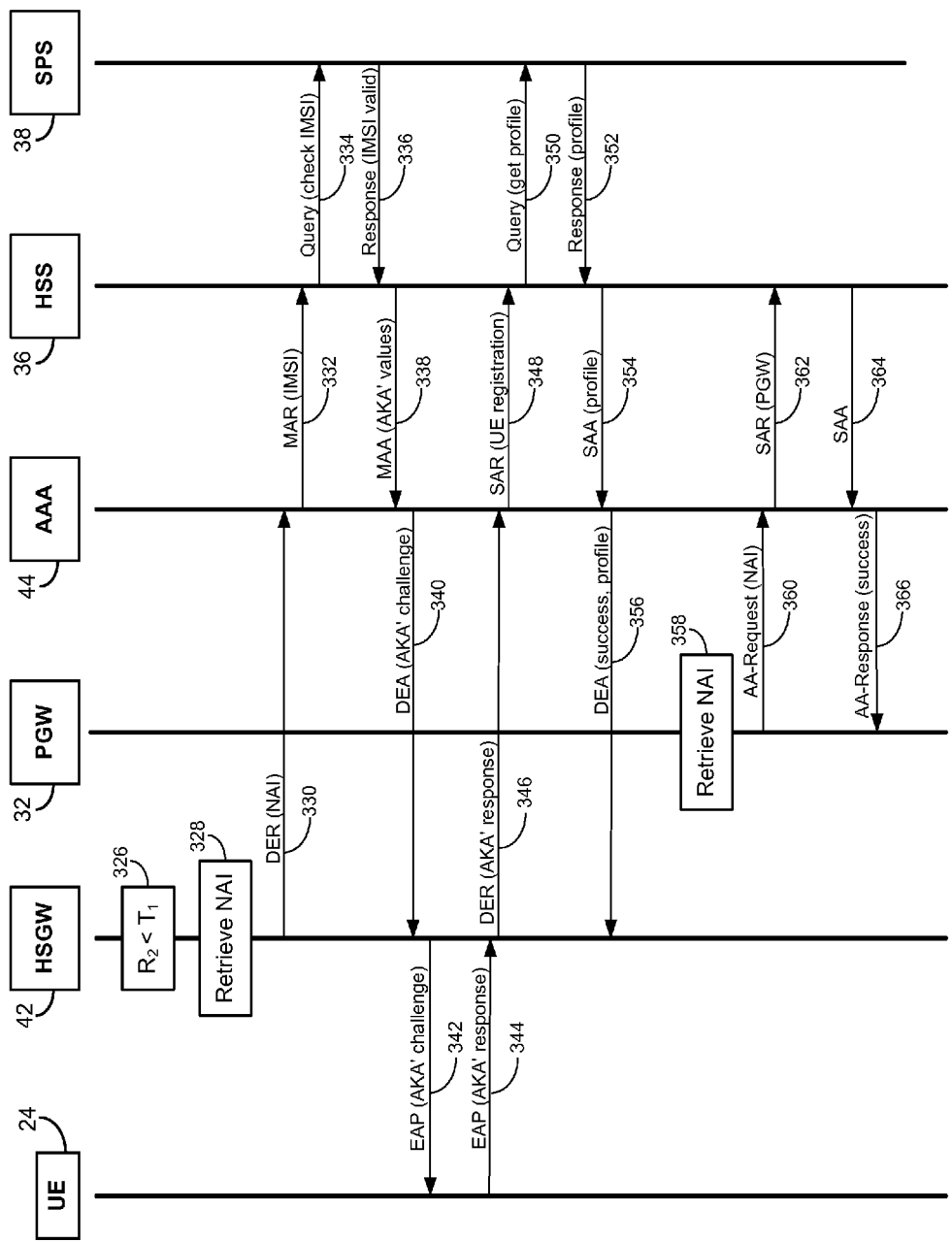
FIG. 7 is a diagram illustrating a continuation of the call flow of FIG. 6 when a subsequent request rate is less than the first threshold, in accordance with an example embodiment.

FIG. 7 illustrates how the example call flow of FIG. 6 may continue when HSGW 42 calculates a new request rate, $R_2$, and determines that $R_2<T_1$ (step 326). Based on the new request rate, $R_2$, being less than the first threshold, $T_1$, HSGW 42 retrieves the NAI of UE 24 that it had stored for subsequent authentication (step 328) and initiates the authentication process for UE 24 (and for other UEs for which HSGW 42 had suppressed authentication). The authentication process initiated by HSGW 42 may involve messages similar to that of steps 208-234 in the call flow of FIG. 4. Thus, the call flow of FIG. 7 includes those messages as steps 330-356.

PGW 32 may also determine that it can now authenticate UE 24 and other UEs for which it had previously suppressed authentication. PGW 32 may make this determination based on an instruction from HSGW 42, based on its own calculated request rate, or based on other information. PGW 32 retrieves the NAI of HSGW 42 that it had stored for subsequent authentication (step 360) and initiates the authentication process for UE 24 (and for other UEs for which PGW 32 had suppressed authentication). The authentication process initiated by PGW 32 may involve messages similar to that of steps 246-252 in the call flow of FIG. 5. Thus, the call flow of FIG. 7 includes those messages as steps 360-366.

If the authentication processes initiated by HSGW 42 and PGW 32 are both successful, then UE 24 can continue using the packet data connection 324. Otherwise, the packet data connection 324 may be terminated by either HSGW 42 or PGW 32.

It is to be understood that the call flows illustrated in FIG. 4-7 are merely examples of the types of messages that could be exchanged by UE 24, HSGW 42, PGW 32, AAA 44, HSS 36, and SPS 38. In other examples, other types of messages could be used (e.g., using different protocols) and/or the other types of network entities could be involved.

4. Example Gateway

Figure 8:
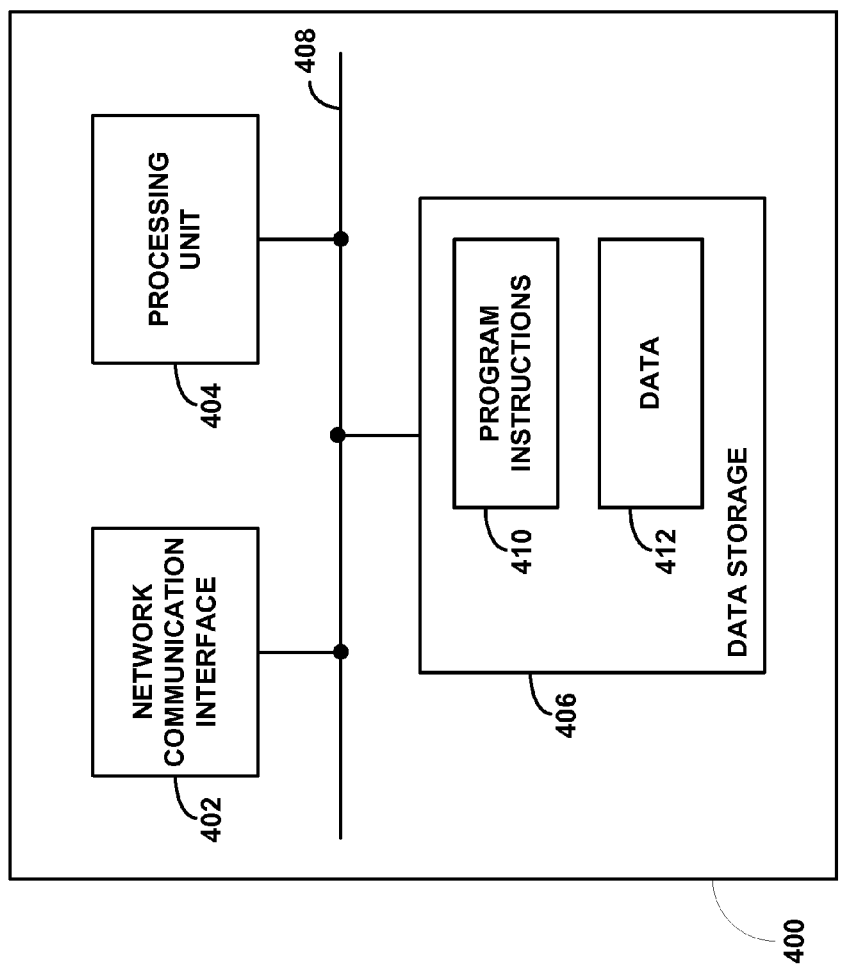
FIG. 8 is a block diagram of a gateway, in accordance with an example embodiment.

FIG. 8 is a block diagram of an example gateway 400. Gateway 400 could be serving gateway (e.g., HSGW 42), a packet gateway (e.g., PGW 32), or some other type of gateway. As shown, gateway 400 includes a network communication interface 402, a processing unit 404, and data storage 406, all of which may be communicatively linked together by a system bus, network, or other connection mechanism 408.

Network communication interface 402 supports communication with various other network entities, such as any of the network entities shown in FIG. 1. As such, the interface 402 may include one or more network interface modules, such as Ethernet network interface modules, or any other type of wired and/or wireless communication interfaces.

Processing unit 404 may comprise one or more general purpose processors (e.g., microprocessors) and/or one or more special purpose processors (e.g., application specific integrated circuits). Data storage 406 may comprise one or more volatile and/or non-volatile non-transitory storage components, such as optical, magnetic, or flash storage, and may be integrated in whole or in part with processing unit 404.

As shown, data storage 406 may hold program instructions 410 and data 412. Program instructions 410 may be executable by processing unit 404 to carry out various functions described herein. Data 412 could be any data that is generated, received, or used in connection with carrying out such functions.

In one example, program instructions 410 may be executable by processing unit 404 to carry out any of the functions described above with reference to FIGS. 2 and 3. Thus, the functions may include: (i) receiving, via the network interface 402, a number of data-connection requests during a period of time, wherein each data-connection request relates to establishing a respective packet data connection for a respective WCD; (ii) determining a request rate based on the number of data-connection requests received during the period of time; (iii) receiving, via the network interface 402, an additional data-connection request, wherein the additional data-connection request relates to establishing a packet data connection for a requesting WCD; and (iv) in response to receiving the additional data-connection request, determining whether to authenticate the requesting WCD based on the request rate. The determination could be made based on comparing the request rate to at least one of a first threshold or a second threshold to determine whether the request rate is less than a first threshold, greater than the first threshold and less than the second threshold, or greater than the second threshold.

5. Conclusion

Exemplary embodiments have been described above. Those skilled in the art will understand, however, that changes and modifications may be made to these embodiments without departing from the true scope and spirit of the invention.

What is claimed is:

1. A method, comprising:
receiving, by a gateway, a number of data-connection requests during a period of time, wherein each data-connection request relates to establishing a respective packet data connection for a respective wireless communication device (WCD);
determining, by the gateway, a request rate based on the number of data-connection requests received during the period of time;
receiving, by the gateway, an additional data-connection request, wherein the additional data-connection request relates to establishing a packet data connection for a requesting WCD; and
in response to receiving the additional data-connection request, determining, by the gateway, whether to authenticate the requesting WCD based on the request rate, wherein the gateway is configured to (i) initiate an authentication process to authenticate the requesting WCD, if the request rate is less than a first threshold, (ii) accept the additional data-connection request without authenticating the requesting WCD, if the request rate is greater than the first threshold and less than a second threshold, and (iii) reject the additional data-connection request without authenticating the requesting WCD, if the request rate is greater than the second threshold.

2. The method of claim 1, further comprising:
determining, by the gateway, that the request rate is less than the first threshold;
based on the request rate being less than the first threshold, initiating, by the gateway, the authentication process to authenticate the requesting WCD; and
determining, by the gateway, whether to accept or reject the additional data-connection request based on whether the authentication process is successful or unsuccessful.

3. The method of claim 1, further comprising:
determining, by the gateway, that the request rate is greater than the second threshold; and
based on the request rate being greater than the second threshold, rejecting, by the gateway, the additional data-connection request without authenticating the requesting WCD.

4. The method of claim 3, further comprising:
transmitting, to the requesting WCD, an indication that the additional data-connection request is rejected due to a flood of data-connection requests from WCDs.

5. The method of claim 4, further comprising:
instructing the requesting WCD to wait for a specified wait time before sending another data-connection request.

6. The method of claim 1, further comprising:
determining, by the gateway, that the request rate is greater than the first threshold and less than the second threshold; and
based on the request rate being greater than the first threshold and less than the second threshold, accepting, by the gateway, the additional data-connection request without authenticating the requesting WCD.

7. The method of claim 6, further comprising:
transmitting, to the requesting WCD, an indication that the additional data-connection request is accepted; and
storing, by the gateway, an identification of the requesting WCD for subsequent authentication.

8. The method of claim 7, further comprising:
establishing the packet data connection for the requesting WCD.

9. The method of claim 8, further comprising:
instructing a packet gateway to establish the packet data connection for the WCD without authenticating the requesting WCD.

10. The method of claim 8, further comprising:
after the packet data connection for the requesting WCD has been established, determining, by the gateway, a new request rate based on a number of data-connection requests received during a subsequent period of time;
comparing the new request rate to the first threshold;
determining that the new request rate is less than the first threshold; and
based on the new request rate being less than the first threshold, initiating, by the gateway, an authentication process to authenticate the requesting WCD.

11. The method of claim 1, wherein the gateway is a serving gateway configured to support interworking between a legacy radio access network (RAN) and an evolved packet core (EPC) network.

12. The method of claim 1, wherein the gateway is a packet gateway in an evolved packet core (EPC) network.

13. A system, comprising:
- a network interface;
- a processor;
- data storage;
- program instructions stored in the data storage and executable by the processor to perform functions, the functions comprising:
    - receiving, via the network interface, a number of data-connection requests during a period of time, wherein each data-connection request relates to establishing a respective packet data connection for a respective wireless communication device (WCD);
    - determining a request rate based on the number of data-connection requests received during the period of time;
    - receiving, via the network interface, an additional data-connection request, wherein the additional data-connection request relates to establishing a packet data connection for a requesting WCD; and
    - responding to the additional data-connection request, wherein responding to the additional data-connection request comprises (i) initiating an authentication process to authenticate the requesting WCD, if the request rate is less than a first threshold, (ii) accepting the additional data-connection request without authenticating the requesting WCD, if the request rate is greater than the first threshold and less than a second threshold, and (iii) rejecting the additional data-connection request without authenticating the requesting WCD, if the request rate is greater than the second threshold.

14. The system of claim 13, wherein initiating an authentication process to authenticate the requesting WCD, if the request rate is less than the first threshold comprises:
- determining that the request rate is less than the first threshold; and
- based on the request rate being less than the first threshold, initiating an authentication process to authenticate the requesting WCD.

15. The system of 13, wherein rejecting the additional data-connection request without authenticating the requesting WCD, if the request rate is greater than the second threshold comprises:
- determining that the request rate is greater than the second threshold; and
- based on determining that the request rate is greater than the second threshold, rejecting the data-connection request without authenticating the requesting WCD.

16. The system of claim 15, wherein responding to the additional data-connection request further comprises:
- transmitting, to the requesting WCD, an indication that the additional data-connection request is rejected due to a flood of data-connection requests from WCDs; and
- instructing the requesting WCD to wait for a specified wait time before sending another data-connection request.

17. The system of claim 13, wherein accepting the additional data-connection request without authenticating the requesting WCD, if the request rate is greater than the first threshold and less than the second threshold comprises:
- determining that the request rate is greater than the first threshold and less than the second threshold; and
- based on the request rate being greater than the first threshold and less than the second threshold, accepting the additional data-connection request without authenticating the requesting WCD.

18. The system of claim 17, wherein accepting the additional data-connection request without authenticating the requesting WCD, if the request rate is greater than the first threshold and less than the second threshold further comprises:
- instructing, via the network interface, a packet gateway to establish the packet data connection for the requesting WCD without authenticating the requesting WCD.

19. The system of claim 18, wherein responding to the additional data-connection request further comprises:
- after the packet data connection for the requesting WCD has been established, determining a new request rate based on a number of data-connection requests received via the network interface during a subsequent period of time;
- comparing the new request rate to the first threshold; and
- based on the new request rate being less than the first threshold, initiating an authentication process to authenticate the requesting WCD.

20. The system of claim 17, wherein responding to the additional data-connection request further comprises:
- transmitting, to the requesting WCD, an indication that the additional data-connection request is accepted; and
- storing, by the gateway, an identification of the requesting WCD for subsequent authentication.

* * * * *